United States Patent
Comar et al.

(10) Patent No.: US 10,776,847 B1
(45) Date of Patent: Sep. 15, 2020

(54) MODELING USER INTENT (71) Applicant: Amazon Technologies, Inc., Reno, NV (US)

(72) Inventors: Prakash Mandayam Comar, Chennai (IN); Srinivasan Sengamedu Hanumantha Rao, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 15/270,489

(22) Filed: Sep. 20, 2016

(51) Int. Cl.
*G06Q 30/00* (2012.01)
*G06Q 30/06* (2012.01)

(52) U.S. Cl.
CPC ............................ *G06Q 30/0625* (2013.01)

(58) Field of Classification Search
CPC ............... G06Q 30/00; G06Q 30/0601; G06Q 30/0633; G06Q 30/0641
See application file for complete search history.

(56) References Cited

U.S. PATENT DOCUMENTS

| | | | | |
|---|---|---|---|---|
| 8,660,912 | B1* | 2/2014 | Dandekar | G06Q 30/06 705/26.1 |
| 2006/0095281 | A1* | 5/2006 | Chickering | G06Q 30/0247 705/37 |
| 2007/0106570 | A1* | 5/2007 | Hartman | G06Q 20/04 705/26.2 |
| 2007/0294240 | A1* | 12/2007 | Steele | G06F 16/338 |
| 2009/0037291 | A1* | 2/2009 | Dawson | G06Q 30/0603 705/27.2 |
| 2010/0114654 | A1* | 5/2010 | Lukose | G06Q 30/00 705/14.54 |
| 2012/0095952 | A1* | 4/2012 | Archambeau | G06K 9/6249 706/52 |
| 2012/0136756 | A1* | 5/2012 | Jitkoff | G06F 3/04817 705/27.1 |
| 2013/0013427 | A1* | 1/2013 | Gonsalves | G06Q 30/02 705/14.73 |
| 2016/0005095 | A1* | 1/2016 | Isaacson | G06F 16/248 705/26.41 |

OTHER PUBLICATIONS

Ashkan, Azin, et al. "Classifying and characterizing query intent." European conference on information retrieval. Springer, Berlin, Heidelberg, 2009. (Year: 2009).*

* cited by examiner

*Primary Examiner* — Christopher B Seibert
(74) *Attorney, Agent, or Firm* — Hogan Lovells US LLP (57) ABSTRACT

The effect of intent bias on content performance can be determined in order to provide more relevant content in response to a query or other opportunity. Performance data can include the frequency with which an action, such as a purchase, occurs in response to an instance of the content being displayed. An intent bias model can be trained using the performance data for two or more intents, such as an action intent and an explore intent. Once the intent bias for an offer is determined, a normalized performance value can be obtained that does not include the effects of the bias. The normalized values can be used to select and place content based on actual performance.

20 Claims, 7 Drawing Sheets

MODELING USER INTENT

BACKGROUND

Users are increasingly turning to content in electronic form, including items offered for sale through various electronic channels. When a user searches or browses for content, such as items offered for sale through an electronic marketplace, relevance information is generally utilized to determine which content to display, as well as the order in which to display that content. For items available through an electronic marketplace, performance metrics such as likelihood of a view, click, or purchase can be used for such ranking and determinations as well. In determining the relevance of a set of search results for a search query received for a user, however, conventional approaches do not take into account various factors that can impact the relevance, and thus do not provide optimal results. The providing of sub-optimal results can cause the user to have to search harder to find the content of interest, which can not only impact the user experience but can also result in additional resources being required to locate, transmit, and display the additional data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing content in an electronic environment. In particular, various embodiments attempt to correct for intent bias when using one or more performance metrics to determine content to be displayed, as well as display locations for that content. Content displayed on a computing device through an application such as a Web browser is often displayed in a determined arrangement, whether in a list, array, or specified pattern. These arrangements are often used to display content such as search results, recommendations, and deals or offers for various items available for consumption. Each instance of a particular piece of content being displayed is referred to as an impression, and the performance of an instance of content can be determined based upon the number of specified actions taken per number of impressions. For example, a common performance metric is a click through rate (CTR), which is generally a percentage of the number of impressions that resulted in a user "clicking" on (or otherwise selecting) an instance of content in order to, for example, obtain additional information. Performance metrics can also include the number of resulting purchases per impression, the number of times an item is added to a virtual shopping cart per impression, and the like.

In some applications, the different intents can correspond to different calls to action. For example, a user might pose a question (verbally, through gestures, or through electronic text) asking for the current time. This question in some embodiments can be received to a recording element and analyze using an appropriate speech-to-text converter or other such mechanism. There may be several appropriate answers to the question, such as "7:15 pm," "kickoff time for the game," "bed time," "time to flip the burgers," and so on. It is possible that all the responses are appropriate, but the most appropriate response may be based on the intent of the user. As discussed elsewhere herein, the intent can be based upon various factors, such as user behavior, historical user action, determined query intent, and the like. Similarly, for task-based requests such as "shut off the lights," there may be multiple appropriate actions, but whether to shut off the lights in the room, only some of the lights in the room, the lights outside the bedrooms, or all lights in the house may depend at least in part upon the intent of the user making the request.

Content to be displayed in an environment such as an electronic marketplace, content will often be selected based upon some measure of relevance. This can include, for example, relevance to a submitted query, relevance to a page to be displayed, or relevance to a user session in which the content is to be displayed. When determining which of the relevant items to display, however, the system might look to various performance metrics in order to display content that is most likely to result in a conversion, or an action such as a view, click, add-to-cart, or purchase, among other such actions. This can be particularly useful for displays such as recommendations and deals or special offers. Presenting content that is selected and arranged based on performance metrics can help to maximize the potential revenue to be obtained from the display.

While such an approach can help to improve overall revenue, the determination of performance is not optimal in at least some situations. The relevance for an instance of content depends not only on the observed performance metric, but also on factors such as the position of the content as displayed. For example, items towards the top of a list might be more likely to be selected than items towards the bottom of a list, and items towards an edge of the display might be less likely to be selected than items towards the center of the display, etc. Thus, the apparent performance of an instance of content can be greatly dependent upon the position where that content is displayed. This can be particularly relevant for arrangements or groupings of content where there is limited mobility of the content to different locations, such as where the content is part of a fixed image or list ranked on other criteria.

Further, a bias such as user behavior or "intent" can impact the relevance of an instance of content to a user. A common query might be submitted by two users, or the same user at different times, but there might be different purposes or intents behind each submission. For example, a user might be searching a topic to attempt to find related content of interest. This can be designated as an "explore intent" as the user typically will not be looking to perform a specific task but instead view various instances of content. A user with an explore intent may be very likely to view instances of content positioned at various locations, such as lower-ranked items on a ranked list. Alternatively, a user might be hoping to perform a specific task, and thus could be determined to have an "action intent." With an action intent, a user might be looking to locate a specific instance of content, make a purchase, identify a specific answer, etc. These users tend to be more focused on specific content and are more likely to view content in locations such as near the top of a ranked list, without being as likely to view other related content. Users with an action intent may be more likely to submit more focused or targeted queries in order to have the content of interest rank more highly in search results or otherwise be positioned in specific locations when displayed.

Approaches presented herein attempt to remove, or at least minimize, the effect of at least some of these biases in selecting content to be presented to a user. In at least some embodiments, it can be desirable to rank or select content based on normalized performance values where the bias has been reduced or removed. If sufficient data is available for a particular instance of content, whereby performance can adequately be determined at the relevant positions for the relevant intents, then the effects of those biases for that particular content can be removed from the performance value.

Figure 1A:
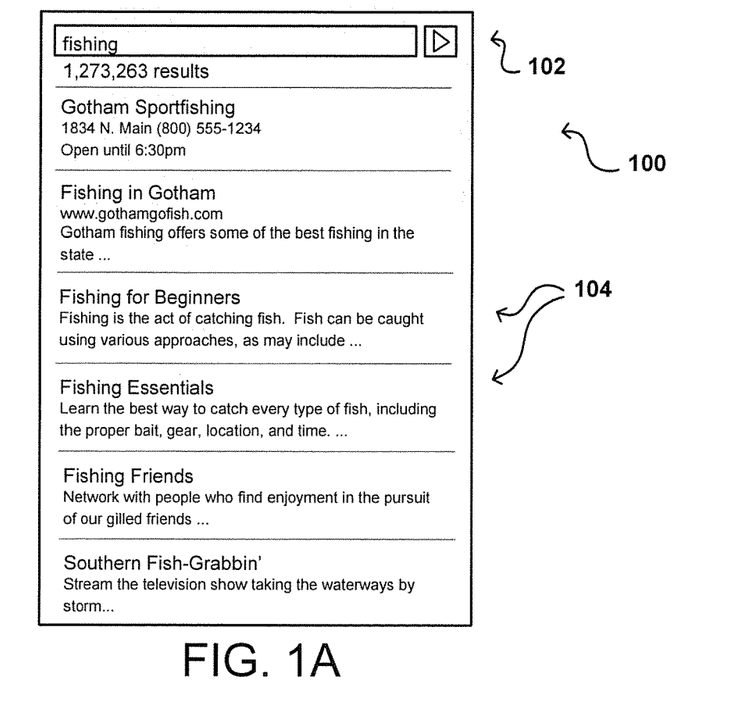
FIGS. 1A and 1B illustrate example displays of content that can be presented in accordance with various embodiments.
Figure 1B:
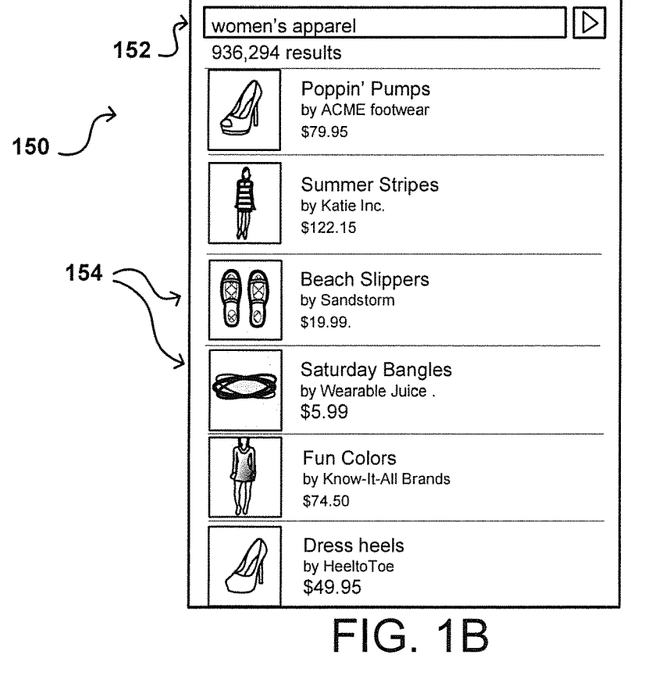

FIGS. 1A and 1B illustrate example displays 100, 150 of content that can be presented in accordance with various embodiments. The example display 100 of FIG. 1A illustrates a set of search results 104 presented for a submitted query 102, in this example the query "fishing." As known for such displays, the search query can be received to a search field that can cause related items to be located and displayed as a list of search results that are typically ranked by relevance. Similar displays can be obtained through other mechanisms as well, such as by receiving a selection to browse a page associated with a category of items. Here, the search results may have been returned from a search engine having crawled various data sources, such that the results may include links to websites, companies, videos, publications, and the like. A user with an explore intent might be interested in viewing various selections of these links in order to learn about fishing. A user with an action intent, however, might click on one of the first links that provides information as to where the user can actually go fishing at the current time and location, and may be less interested in other information about fishing.

Similarly, the example display 150 of FIG. 1B illustrates a set of search results 154 presented for a different submitted query 152, here the query "women's apparel." In this example, the query was executed against a digital catalog of an electronic marketplace, such that the search results 154 returned each relate to a product offered for consumption (i.e., purchase, lease, rent, download, stream, or otherwise obtain) via the marketplace. A user with an explore intent might view the links for items of various types, located at various positions on a page, while a user with an action intent might be looking for a specific item, or type of item, to purchase, and may look at the first few links, or refine the query if the item of interest is not located in the first few search results.

For both examples, the position of each result or instance of content on the display will typically be determined based at least in part upon a relevance of the products to the query, user, or other such determining factor. As mentioned, however, for environments such as an electronic marketplace it can be desirable to select and place at least some of the content in a way that will help drive revenue for the marketplace. One way to accomplish this is to attempt to determine the relative performance of potential items to be displayed, and then select and/or position the offers for those items based at least in part upon the performance data. Ranking and measuring the performance (e.g., click-through rates or purchase rate) of items plays an important role in applications such as search, advertising, and content placement. For advertising, suggested content, and other such offerings, which typically correspond to a product or service available for some type of compensation, this can involve presenting several of these offers or "deals" on a common display, such as a webpage or mobile application display. In order to present the deals that are most likely to be of interest to a potential customer, and thus result in a consumption (i.e., a purchase, lease, rent, or download), the deals can be ranked or ordered based at least in part upon their estimated consumption probabilities, although views, clicks, impressions, or other such metrics can be used as well for various types of content and deals.

In some situations the ranking is based at least in part upon an estimated relevance or quality of the deal with respect to a certain page, query, type of user, or other such factor. These values are often determined at least in part by monitoring or tracking the number of actions taken by users with respect to displays of each respective deal (or similar types of deals). In many cases, this can include a click through rate (CTR) or other such metric that identifies, for example, the frequency with which users clicked on content for a displayed deal when that deal was displayed to a user (or at least on displayed on a display screen or other such mechanism).

Approaches in accordance with various embodiments can attempt to factor the observed performance (e.g., click) data into user intent and content relevance. This can be performed in at least some embodiments using a matrix factorization approach derived from a probability distribution, such as a Poisson-Beta or Poisson-Gamma generative model. Various approaches can also attempt to smooth different types of bias across queries, as each bias type may not be present in every individual query. Further, within intent bias there can be various types of intent that are determined and utilized to improve relevance. These can include, for example, action (e.g., purchase or consume), explore (e.g., navigate or obtain information), ambiguity, task complete, decision making, and the like.

For discussion purposes the variable I will be used to designate impressions (or instances of content displayed) and the variable C will be used to designate the number of clicks, although as mentioned various other types of performance or actions can be utilized as well within the scope of the various embodiments. The variable E will designate the examination and R will designate the relevance. Each of these variables can be indexed by one or more of following index variables: i and p are indexed over item set and positions, respectively, and k for user intent. The indexed variables can be treated as random variables, such that the terms $E_{pk}$ and $C_{pk}$ are binary valued random variables, respectively, representing whether a user examined and clicked position p with intent k, and $R_{pk}$ is a binary valued random variable representing whether an item placed in position p is relevant to the query with respect to intent k. Let $b_{pk}$ will denote the probability of examining position p with intent k, given by:

$$Pr(R_{kp}=1)=r_{\pi_p k}$$

and $$Pr(E_{pk}=1)=b_{pk}$$

where $\pi_p$ denotes the item placed in position p. In the above expression, the probability is computed over all the search engine users (or sessions) with a particular intent.

In order to attempt to counter intent bias, an assumption can be made that an item placed in position p is clicked with intent k, if and only if it is examined with respect to the same intent and has non zero relevance for that intent. The relevant random variables can be given by:

$$C_{pk}=1 \Leftrightarrow E_{pk}=1 \text{ and } R_{pk}=1$$

and according to the intent hypothesis:

$$Pr(C_{pk}=1|E_{pk}=1;R_{pk}=1)=1$$

along with the following corollaries. The probability of clicking a position p with intent k is zero under the certain conditions, such as where the position is never examined by the user, irrespective of the item relevance, or where an irrelevant item with respect to intent k is placed in that position, irrespective of whether the position has been examined by a user.

Assuming independence between examination of position p and the relevance (true click through rate) of item in position p, from the above corollaries, the following is the click through rate probability with respect to an intent:

$$Pr(C_{pk}=1) = \sum_{b,r=\{0,1\}} Pr(E_{pk}=b)Pr(R_{pk}=r)$$

$$Pr(C_{pk}=1|E_{pk}=b,R_{pk}=r)$$

$$= Pr(E_{pk}=1)Pr(R_{pk}=1)Pr(C_{pk}=1|E_{pk}=1,R_{pk}=1)$$

$$= b_{pk} * r_{\pi_p k}$$

In practice $C_{pk}$ is not observed as the intent behind a user click that is never observed, rather we observe $C_p$, the total clicks at position p. This is obtained by marginalizing over the intents, as may be given by:

$$Pr(C_p=1) = \sum_k Pr(C_{pk}=1)$$

$$= \sum_k b_{pk} * r_{\pi_p k}$$

$$= \sum_k \text{examination bias } wrt \text{ intent } k * \text{true item } CTR \text{ for intent} k$$

Finally for each query, the data D consists of the total impressions and clicks an item i receives at position p. Here, the observed clicks $C_{ip}$ is the superposition of clicks generated by different intents which needs to be uncovered in order to estimate the true item relevance.

Accordingly, approaches in accordance with various embodiments utilize a generative model for estimating the true relevance of an item with respect to each intent, as well as the intent imprints as a function of position bias. The probability of an user clicking on item i at position p with intent k can be given by:

$$P_{ipk}=b_{pk}*r_{ik}$$

A simple and interpretable probabilistic model that can explain the observed data D is a Poisson model, as may be given by:

$$C_{ip} \sim \sum_k \text{Poisson}(I_{ip} * P_{ipk})$$

Here, the clicks an item i receives at a position p is an aggregation of clicks arising from the multiple intents, where each intent is a Poisson random variable with the rate $P_{ipk}$. Since the sum of Poisson random variables is a Poisson with a rate parameter being the simple sum of all rates, the model can become:

$$C_{ip} \sim \text{Poisson}\left(I_{ip} * \sum_k P_{ipk}\right)$$

By then letting $Y_{ip}=I_{ip}*P_{ipk}$, $C_{ip} \sim \text{Poisson}(Y_{ip})$, the unknown parameters in the model are the bias and relevance terms, which can be estimated by maximizing the following likelihood function:

$$Pr(C_{ip}|I_{ip},b_{pk},r_{ik}) = \prod_i \prod_p \frac{Y_{ip}^{C_{ip}} \exp(-Y_{ip})}{C_{ip}!}$$

An update for above likelihood function gives following multiplicative updates for the latent factors:

$$r_{ik} = r_{ik} \frac{\sum_p \frac{C_{ip}}{Y_{ip}} b_{pk}}{\sum_p I_{ip} b_{pk}}$$

$$b_{pk} = b_{pk} \frac{\sum_i \frac{C_{ip}}{Y_{ip}} r_{ik}}{\sum_i I_{ip} r_{ik}}$$

The update equations for $r_{ik}$ and $b_{pk}$ are interdependent or cyclic, requiring multiple iterations to converge to an optimal value. At any iteration, if the optimal value for one of the parameters is reached, then the other parameter can be estimated with good accuracy. In particular, starting with a good estimate of $(b_{pk})$ results in an accurate estimate for $r_{ik}$. The estimator of $b_{pk}$ given above depends on $I_{ip}$. In order to get a good estimate of $b_{pk}$, there should be a sufficient number of impressions for each item in each position. In other words, it can be desirable for $I_{ip}$ to be sufficiently large for each (i,p). In practice, an item may get impressed in very few positions, making $I_{ip}$ a sparse matrix. As a result, the $b_{pk}$ estimates may not be accurate, which in turn affects the $r_{ik}$. The problem of noise caused due to data sparsity can be addressed by adding a prior probability over the latent factors. Since these latent factors are interpreted as probabilities, they can take values in the interval [0 1], therefore, a Beta can be imposed prior. Also, as fixing one latent factor results in good estimate for other, the prior may be imposed on only one of the factors. The posterior distribution of bias and relevance factors, given the data D is proportional to the likelihood, as may be given by:

$$Pr(B,R|D) \propto Pr(C|Y)Pr(B|c_k,d_k)$$

where the variables B and T to denote the matrix whose elements are $b_{pk}$ and $r_{ik}$, respectively. The prior probability on bias factors can be given by:

$$Pr(B|c_k,d_k) = \prod_p \prod_k \frac{b_{kp}^{c_k-1}(1-b_{pk})^{d_k-1}}{B(c_k,d_k)}$$

where $B(c_k, d_k)$ is constant independent of $b_{kp}$. This changes the update equation for the bias factor as follows:

$$b_{pk} = b_{pk} \frac{\sum_i \frac{C_{ip}}{Y_{ip}} r_{ik} + \frac{c_k-1}{b_{pk}}}{\sum_i I_{ip} r_{ik} + \frac{d_k-1}{1-b_{pk}}}$$

Priors were not imposed on the true click through rate factor as restricting both latent factors to prior may constrain the predictive power of the model. Nevertheless, the priors were tried on both factors and the results were not better than using a prior on a single factor.

In order to test the performance of the intent-based relevance estimation algorithm on a search dataset, a set of approximately 50,000 queries was utilized under a specific category. The proposed multi-intent model with two intents gives the best result on this data set. The first intent (of two intents) from the proposed multi-intent Poisson-Beta model gave the highest mean reciprocal rank across all the query categories. In particular, the first intent outperforms all other relevance measures when the query length increases. Here, the intents correspond to an action intent and an explore intent as explained elsewhere herein. Users having an action intent typically issue a pointed query (in the case of a generic query like fishing, users with a purchase intent tend to refine the search results with additional category filters to narrow the choice of retrieved items) and the purchases typically happen from the first few positions. The purchase rate rapidly drops thereafter. Users with an explore intent tend to move between pages, clicking (exploring) on items until they settle for an item of their liking. A distinguishing aspect of the action intent estimated from the proposed model is that the action intent decreases more rapidly than the position bias estimated by the baselines algorithms like SI-Gamma and SI-Beta, which in turn impacts the estimated item relevance.

Figure 2A:
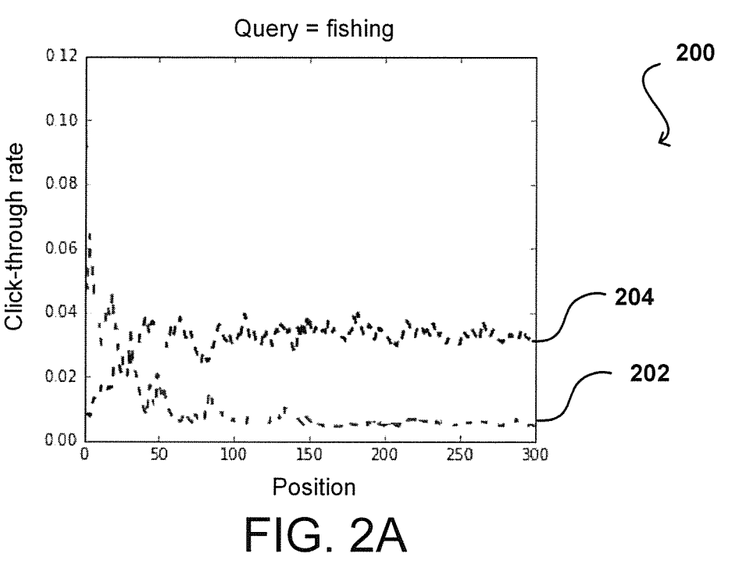
FIGS. 2A and 2B illustrate plots of click through rate versus position for different intents as can be determined in accordance with various embodiments.
Figure 2B:
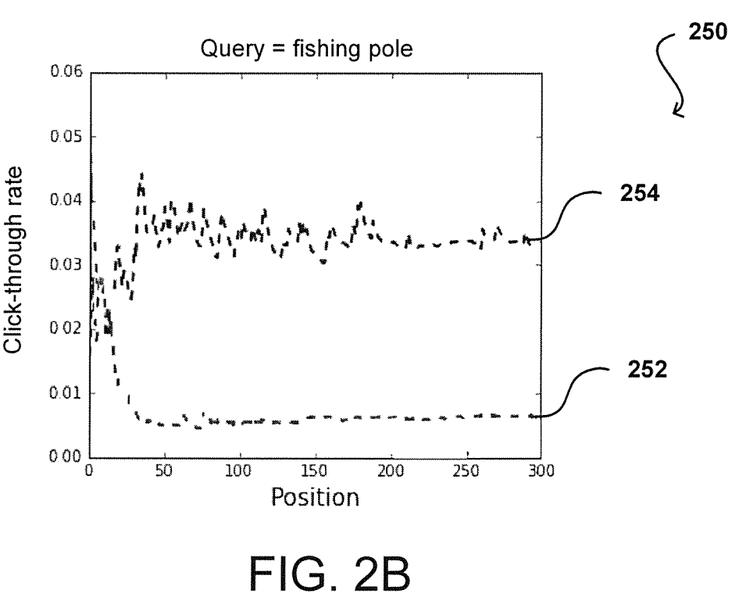

The proposed multi-intent Poisson-Beta algorithm with K=2 for two intents can be used to identify both the intents and the associated relevance factors. FIGS. 2A and 2B illustrate intent profiles for the queries fishing and fishing poles, where the fishing poles query has a greater level of specificity. If the example plot 200 of FIG. 2A, a first intent profile 202 corresponds to an action intent, and a second intent profile 204 corresponds to an explore intent. The query "fishing" corresponds to a generic word which retrieves content for a variety of items from several different categories, including fishing gadgets or equipment, fishing related apparel, fishing related books, and the like. This particular query has a very strong exploratory intent and in practice it has been determined that the users have clicked items placed at several different positions across multiple pages. As illustrated, the action intent starts off with a very high (smoothed) click through rate for the initial positions then falls off rapidly until after the fiftieth position there is very little CTR at any position. Alternatively, the explore intent starts off relatively slowly then by the fiftieth position shows relatively consistent CTR across positions. This suggests that in early positions the action intent dominates over the exploration intent.

When the query "fishing" is refined to "fishing poles," as illustrated in the example plot 250 of FIG. 2B, the CTR for the action intent profile 252 drops more rapidly compared to the action intent in the "fishing" query. This has been confirmed empirically as the action intent rapidly drops and the explore intent starts to dominate at early positions when moving from a generic to a specific query. This is because for very specific query there are few relevant content items and most of those items will be placed in early positions. Users going past these early positions will likely have an explore intent, illustrated by the explore intent profile 254 of FIG. 2B. In a test where the query was refined to the specific "fishing float tubes" query, the data has very sparse clicks resulting in erratic observed CTR in the different positions. Both the bias correction algorithm and multi-intent algorithm smooth this erratic CTR by assigning an almost constant click through rate to all positions. Here, all the observed clicks are absorbed into the relevance factors ($R_{ik}$). From an intent perspective, since there is lack of information (clicks) the model assigns a single intent as seen from the single trend for both the intent factors. For this query the relevance terms corresponding to the two intents have different magnitudes but the same ordering, resulting in a large positive correlation.

Figure 3:
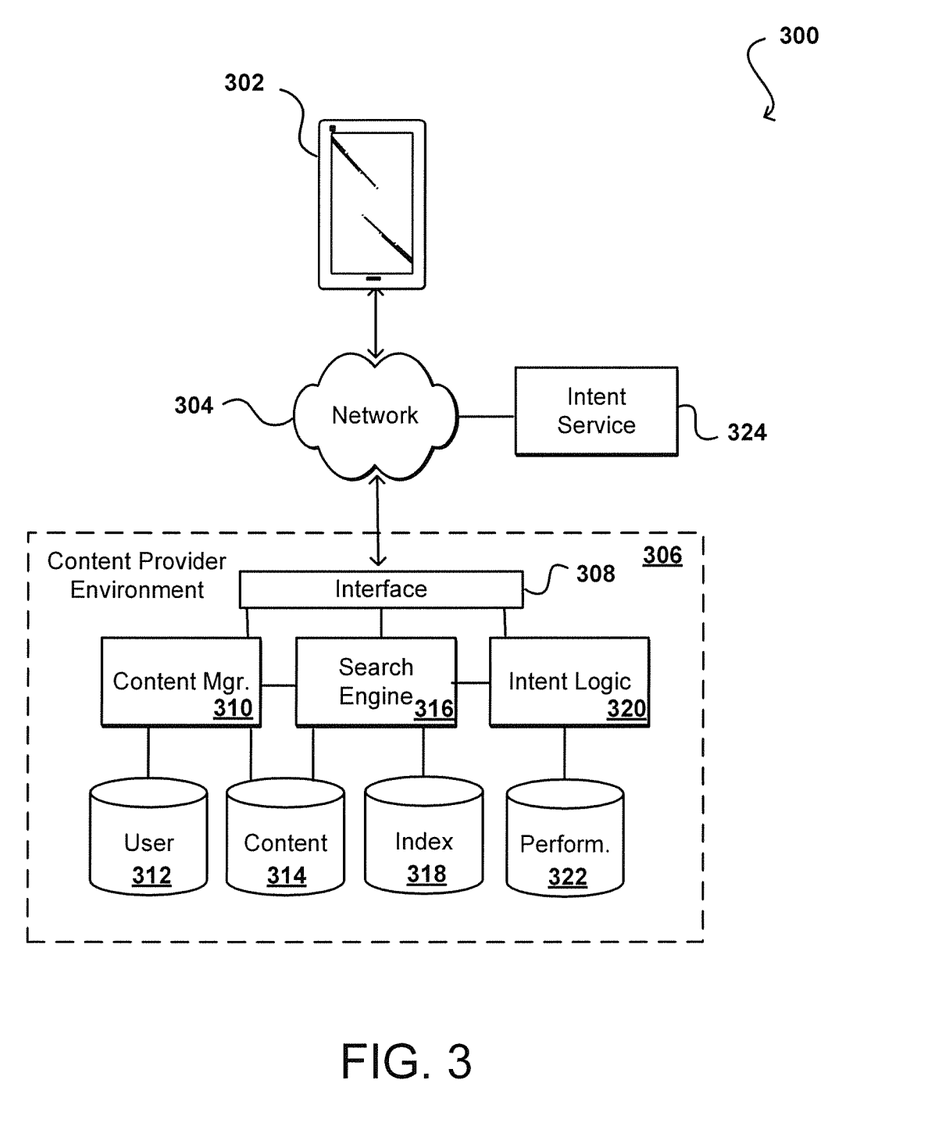
FIG. 3 illustrates an example environment in which various embodiments can be implemented.

FIG. 3 illustrates an example environment 300 in which aspects of the various embodiments can be implemented. In this example, a computing device 302 is able to make a call or request across one or more networks 304 to a content provider environment 306. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud").

In this example, a call received to the resource provider environment 306 can be received by an interface layer 308 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 310 and/or content servers, which can obtain the content from a content data store 314 or other such repository to be sent back across the network(s) to the computing device. In some embodiments, information for the request might also be compared against user data in a user data store 312 or other such location do determine, for example, whether the user has access rights to that content. In some embodiments user data might also be analyzed to determine which type of content to provide, additional supplemental content to provide with the primary content, and the like.

If the request is a request for search results, for example, information for a received query can be directed by components of the interface layer 308 to a search engine 316 that is able to utilize data from an index 318 to determine the appropriate search results. As known for search engines, the search engine 316 may be configured to crawl the content data store 314 or other such data sources in order to index that data, in order to facilitate the rapid and accurate location of search results from the search index 318 in response to a received query. The provided search results in at least some embodiments can then provide links to content stored in the content data store 314. In some embodiments lists or selections of content can also be provided for various categorization pages, or other collections of content, where those collections or selections are determined based on relevance or other criteria for a specific category or type of content, among other such options.

For content, such as pages or descriptions of items offered for consumption, where it may be desirable to prioritize by performance, it can be desirable to train a bias model as discussed herein. As mentioned, this can include training for various types of bias, such as position and intent bias. In this example the content provider environment 306 will at least include a bias model training component or service that includes intent logic 320 for determining intent and training a bias model using the determined intent data. A data store 322 can store the relevant action and position data, which can be analyzed by the intent logic 320 that can use the data to train, test, and/or refine the model over time. When a request for content is received, the content manager 310 can communicate with the search engine 316, or other such system or service, to attempt to determine normalized ranking scores for the various relevant offers that can be used by the content manager to select and/or position the content to be displayed. In some embodiments the search engine might consult one or more rules stored in a rules data store, or other such location, for assistance in properly ranking the offers. For example, some types of content might be ranked based on purchases, while other types might be ranked based on views or clicks, or combinations thereof. The rules also might specify minimum levels of certainty, minimum amounts of data, or other such criteria relevant to the ranking. The content manager 310 can then use the ranking data to generate the appropriate page data to send to the client device 302. As mentioned, in some embodiments the content might be received from a third party provider, or the content might be provided to the client device using a link to content provided by the third party provider, among other such options. In some embodiments, the intent data and training of the bias model might be performed by an external intent service 324 or system, which can have access to at least the performance data in the performance data store 322 in order to train the appropriate bias model and provide the bias-adjusted relevance values for use by the content manager 310 and/or search engine 316 in selecting and/or ranking content.

As mentioned, performance data such as the clicks detected for a specific user for a given keyword can be analyzed, in order to classify those clicks into a type of intent. This process can be repeated for each user, keyword, or other such object in a data set to be analyzed. In this example the performance data will be classified by the intent logic 320 into either an action intent or an explore intent. The intent bias determined for the data can be used to determine the actual relevance of the content items with respect to the keyword for each of those intents. Further, when a request is received for content, a component such as the intent logic 320 can attempt to determine the intent behind the request, which can then be used to adjust the ranking and/or selection of content to be provided based at least in part upon the determined intent. If the query is refined, the intent logic can attempt to determine the type of refinement in order to determine how to update the intent determination. For example, if the query is a narrowing query with the addition of one or more keywords then the prior intent determination data may be used as a starting point, whereas an alternative query with one or more different keywords might require a new intent determination or a fresh start, among other such options.

Although various examples presented herein relate to search, it should be understood as discussed elsewhere herein that advantages of the various embodiments can apply to other situations as well. For example, selecting or ranking content for various navigational approaches based on categories or other content groupings can take advantage of intent bias determinations. Similarly, in some embodiments a user might speak a question that is received to a speech recognition algorithm and is able to determine the question and provide an answer in response thereto. The intent bias might be used to assist in determining the best possible answer. For example, if a user asks a question such as "Can you tell me about product X" then for an explore intent the best answer might be a description of that product, which for an action intent the best answer might relate to a purchasing option or location from which that product can be obtained. For any question or selection where there are multiple potential answers or options, the intent bias can be used to attempt to determine the most accurate ranking or selection for the present intent and/or other such bias. The response can thus be a function of the question, the user intent, and any other bias determined to be relevant to the question, etc.

The intent logic 320 can collect data for each keyword of a set of keywords across all decisions that were made, such as search results for received search queries, and can determine the content that was retrieved and provided in response to those decisions. The intent logic 320 can also determine the relative positions in which those instances of content were placed, as well as performance data for the instances of content in each position. As mentioned, the performance data can include data such as clicks, views, purchases, consumptions, and other specified actions. As mentioned, the performance by position will vary based on intent, so this data can be used to model the impact of intent on performance for the various keywords, and based on the intent and performance data the true relevance of an instance of content can be determined for a specific keyword or query. The bias model presented above can be trained using the performance data and related data to estimate the true relevance for each type of intent and/or with the intent bias removed, among other such options.

In order to ensure that the bias data reflects current trends and incorporates the latest updates or newly available data, the models can be trained on a regular basis, such as daily or weekly. Various other regular or irregular training periods can be used as well, as well as manually triggered updates and other such options. If the models are trained using bulk data then decays or weightings might be applied such that older data does not impact the determinations as much as recently received data.

Figure 4:
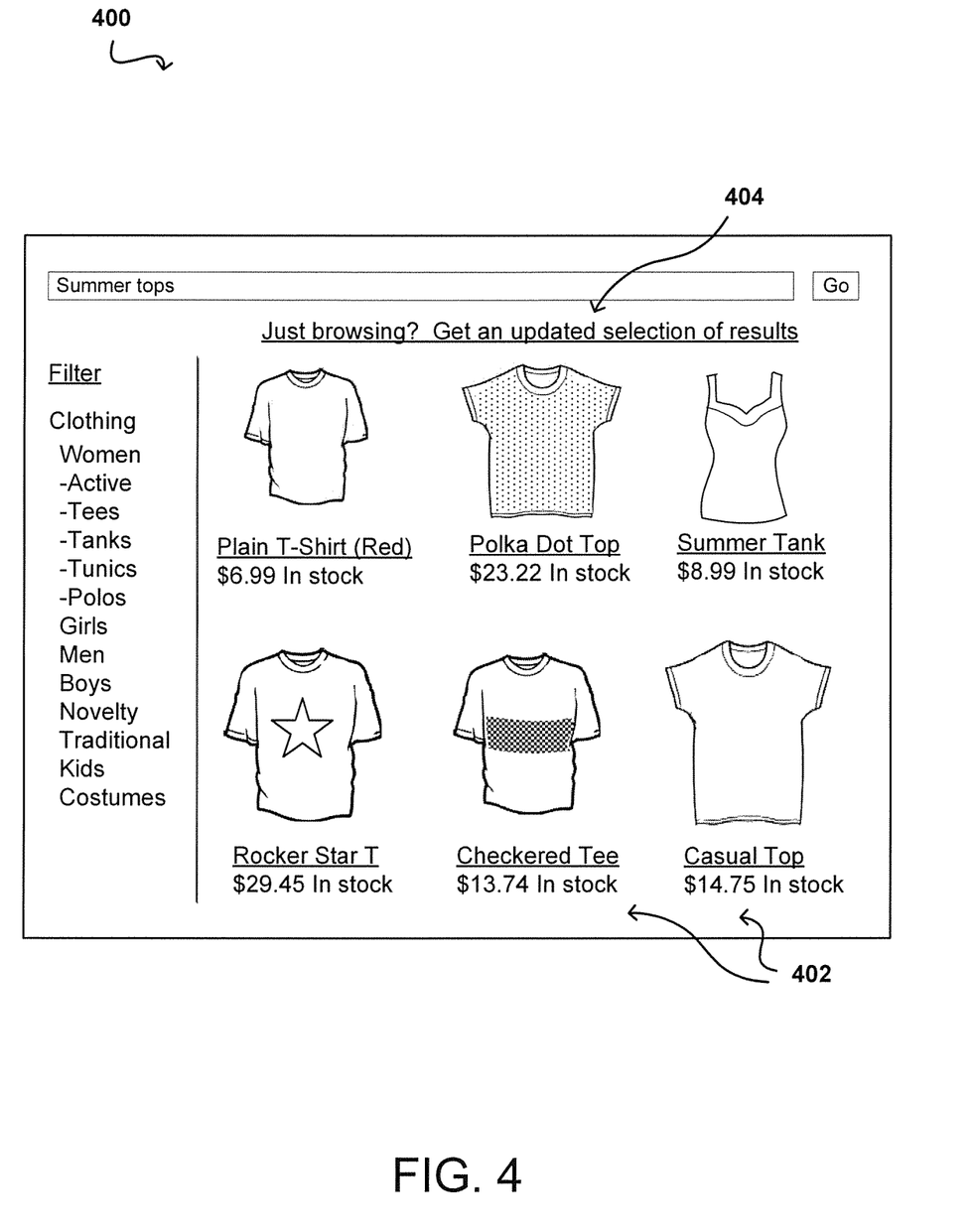
FIG. 4 illustrates an example display of content selected for a determined intent that can be presented in accordance with various embodiments.

In some embodiments the intent determinations can also be surfaced, directly or indirectly, to various users. For example, the display 400 of FIG. 4 illustrates a set of content items selected and arranged for display for a specific intent, here an action intent. It is possible, however, that while the user's actions appeared to correspond to an action intent, the user's actual intent is more of a browse or explore intent. In this example, an option 404 is presented that enables the user to correct this intent determination in order to receive a new selection, ordering, and/or arrangement of content that is appropriate for the actual intent. Various other approaches can be used as well. For example, two sets of results could be displayed that represent one set for each intent. The user could alternatively be asked for his or her intent up front, or as a refinement, or an option (i.e., a button or switch for a binary option or a slider for a more granular two-intent option) can be provided in order to enable the user to specify his or her intent. For embodiments where three or more intents may be determined, there may be check boxes or other options provided that enable the user to specify multiple intents. A user could also apply a filter or select a specific page corresponding to the user's intent. Instead of a "go" or "search" button there could alternatively, or additionally, be intent-specific buttons such as "shop" or "explore." Various other approaches can be used as well within the scope of the various embodiments.

As mentioned, aspects of the various embodiments can improve the performance of computing systems and devices in a number of different ways. As mentioned, the ability to determine intent and provide more relevant results can enable users to locate the content of interest more quickly, reducing the amount of compute and display time for the computing device. Further, the improvement in accuracy means that fewer less relevant content items will be transmitted and displayed, improving the bandwidth, memory, processing, and other resources that would otherwise be dedicated to these less relevant items. Further still, the various embodiments provide an improved interface that is simplified and produces more accurate results. The interface can provide added flexibility and simplified filtering and location capabilities. The intent determination can also be provided as a service that can assist users and providers, among other such entities.

Figure 5:
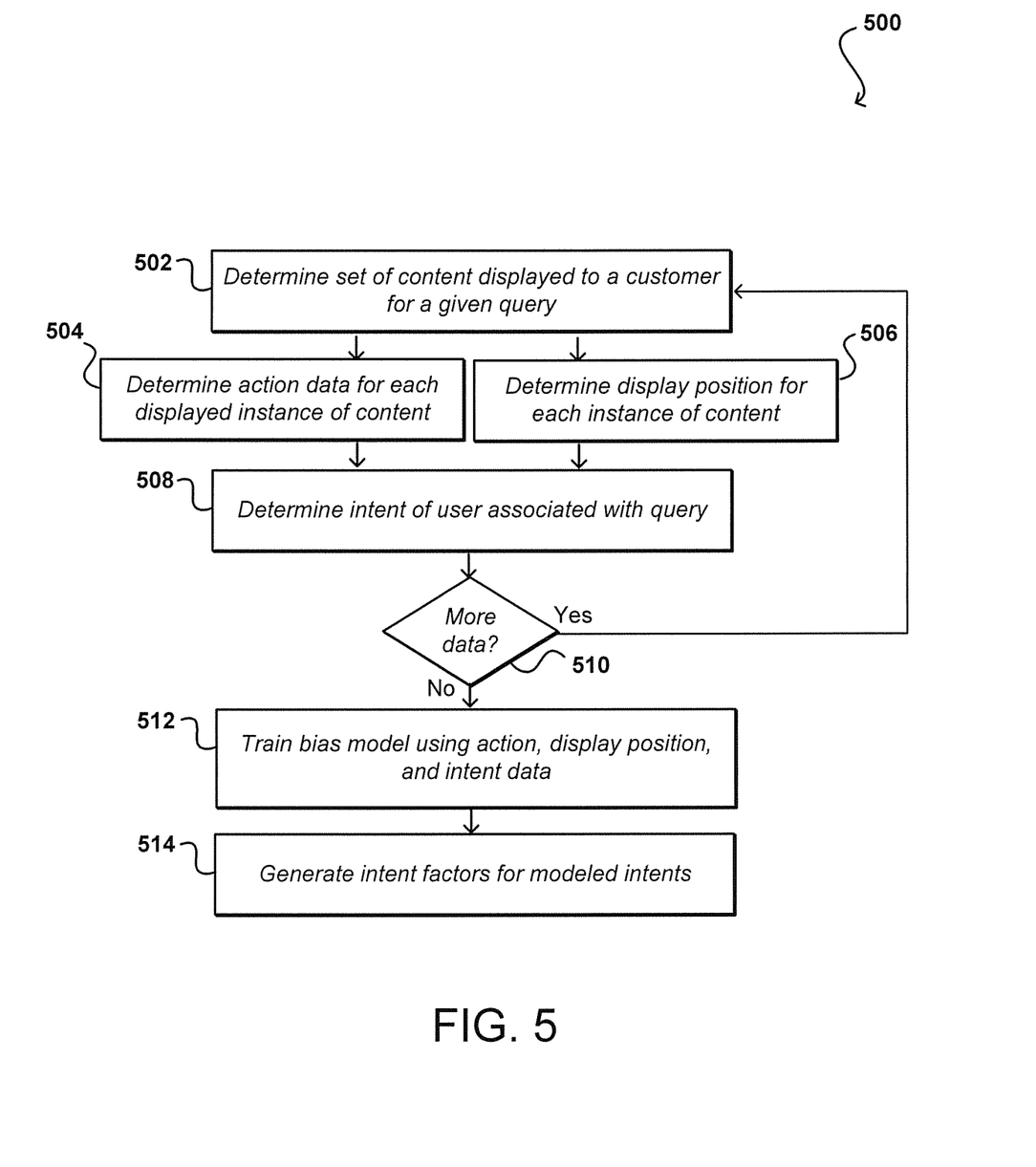
FIG. 5 illustrates an example process for training an intent bias model that can be utilized in accordance with various embodiments.

FIG. 5 illustrates an example process 500 for training an intent model using performance data that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of content displayed to a customer for a particular query can be determined 502. This set can be one of a number of sets of content displayed over a period of time for which action and position data is available and that should serve as a training set for one or more future instances of content. Once the set is determined, the action data for each instance of content can be determined 504, as well as the corresponding position data 506. As mentioned, the action data can include information such as information about displays or impressions; of views, clicks or selections; and purchases or conversions, among other such options. The position data can also include information about the position where content was displayed for each instance. The position data can be defined based upon specific locations or portions of content, such as a center (or centroid) position, an upper left coordinate, a boundary region, or other such designation. The position data with respect to the page or display can be defined in a number of different ways, which can be relative to the screen or relative to the page, among other such options. In some embodiments the position data can be relative to the page, but this might be inadequate if the zoom level or viewing area of the screen is such that a portion of the page is never displayed. The position relative to the screen can also be used, but the display area for the page might be less than the screen size such that a center location of the page is offset from a center location of the screen. Accordingly, approaches in accordance with various embodiments can attempt to determine the viewable or displayed area of the page, and then determine position data relative to the bounds of the displayed area. These can include coordinate positions, percentage values, specified zones, dominant regions, or other such designations. The designations can depend at least in part upon the desired level of granularity, as an array with 10×7 possible regions may require much fewer data points and less precision than a situation where the position bias is to be defined by a function where a specific pixel location can be provided as input, for example.

The action and display position data can be used to help determine 508 the intent of a user associated with a query. For example, if a user looks at a few initial instances and makes a purchase or takes another action then the user might be associated with an action intent for that session. If the user instead looked at multiple instances over many pages of results and did not take a specific action then the user can be determine to have had an explore intent. These intents can then be considered when using the corresponding data to train the intent model. Other factors may be used as discussed elsewhere herein, as may include query specificity, query or result refinement, historical behavior, and the like. A determination can be made 510 as to whether there is more data to be processed, such as other data for the same customer or session or data for other customers, etc. If so, the process can continue. If not, the action, display, and/or intent data can be used with any other relevant data (such as previously processed data) to train 512 an intent bias model. From the training, a set of intent factors can be generated 514 for the modeled intents. As mentioned, these can be query specific in some embodiments or query agnostic in others. There can be at least one intent factor generated for each intent, where the intent factor depends at least in part upon the position for a result given a determined intent.

Figure 6:
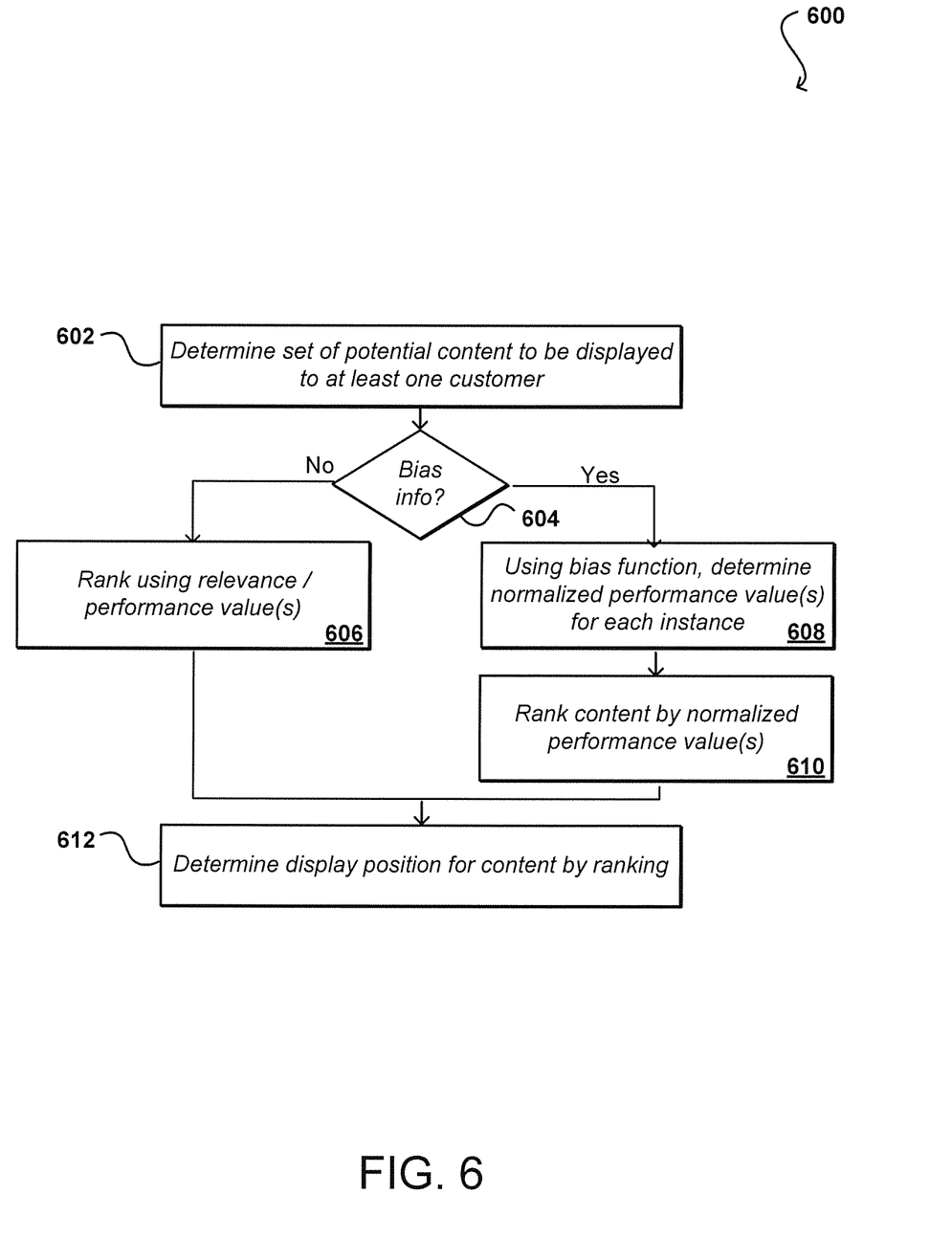
FIG. 6 illustrates an example process for determining normalized result rankings using a trained intent bias model that can be utilized in accordance with various embodiments.

FIG. 6 illustrates an example process 600 for determining a selection, ranking, and/or arrangement of content to be displayed using an intent bias model in accordance with various embodiments. In this example, a set of potential content (such as deals or offers) to be displayed for at least one customer can be determined 602. The content can include content for items to be recommended to a customer, items corresponding to a search request, or items to be suggested as a set of deals to a number or set of customers, among other such options. The set can be determined based upon factors such as relevance, among other such factors. A determination can be made 604 as to whether intent bias information is available for the particular query, user, or opportunity. This can include, for example, whether one or more bias models exist that are both properly trained and relevant to the determined content or opportunity. If the bias information is not available, the content for the query can be ranked 606 using conventional mechanisms, such as ranking by relevance and/or performance values, even though performance values for the ads may include some position or intent bias as discussed herein. If bias information is available, such as whether a current user or query is associated with a specific intent, or a specific intent can be determined, then the appropriate trained bias function or model (e.g., a corresponding intent model) can be used to determine 608 one or more normalized performance values for each instance of content, or at least a subset of the content. The performance values to be normalized can depend at least in part upon the rules or policies for the deals, such as to rank or prioritize based on clicks, cart adds, or purchases, among other such options. As mentioned elsewhere herein, performance values can also relate to responses that were deemed to have properly answered questions, actions that were determined to complete specified tasks, interactions, gathering of information, and the like. Once the normalized values are obtained, the content can be ranked 610 by the normalized values. This can include, as discussed elsewhere herein, generating an ordered ranking and then selecting at least a subset of highest-ranked content items to be selected for display. The display positions for the selected content can then be determined 612 based at least in part upon the ranking. Since certain areas or display positions will be most likely to result in an action for a determined intent, the highest ranked instance of content can be placed in the most likely action position for a specific intent, followed by the next highest ranked instance of content, and so on. For an action intent this can involve placing the highest ranked items in the first few results, while for an explore intent this can involve placing items after the first few results and scattered over the next several results, among other such options as may be determined using the trained models. In some embodiments, the type of arrangement used for the display can also be determined based at least in part upon the normalized performance values and other such information.

Figure 7:
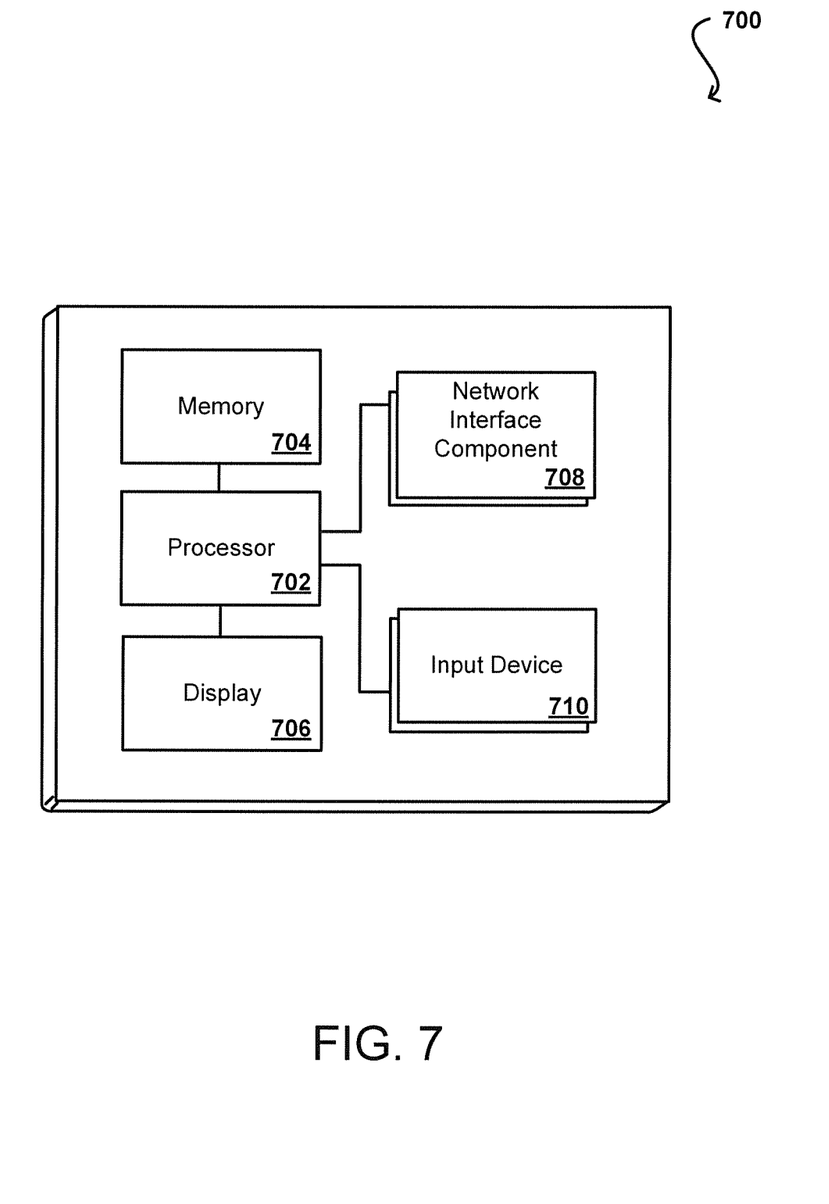
FIG. 7 illustrates example components of a computing device that can be utilized in accordance with various embodiments.

FIG. 7 illustrates a logical arrangement of a set of general components of an example computing device 700 that can be used to implement aspects of the various embodiments. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 708 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 8 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle*, Microsoft*, Sybase*, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining by a content provider associated with a content manager executing in a network environment, for each instance of content of a set of content to be presented, performance data and an intent factor, the intent factor indicating a contribution to values of the performance data corresponding to a respective intent for each presentation of the instance of content, the intent factor determined using a multi-intent model trained, via a bias model executing in the network environment, using aggregated performance and position data for a plurality of instances of content, the aggregated performance based on interactions of a plurality of users with the respective instances of content to classify an intent purpose for interacting with the respective instances of content;

determining by the content provider, for each instance of content of the set, a normalized performance value based at least in part upon a respective performance value and a respective intent factor for the instance, the intent factor based at least in part on a change in performance data, associated with a change in click through rate, as a function of the position data, wherein a decreasing click through rate is indicative of an action intent, and an increasing click through rate is indicative of an explore intent; and providing, by the content provider and in response to a query, at least a subset of the instances of content of the set based at least in part upon the respective normalized performance values, the subset of instances being transmitted to a user device for display on the user device, associated with the query.

2. The computer-implemented method of claim 1, further comprising:

obtaining the performance data and the position data or each instance of content of the set, the performance data indicating a number of actions taken for a respective instance with respect to a number of times the respective instance was displayed, the position data indicating a display position for each of the number of times the respective instance was displayed;

obtaining intent data for each of the number of times the respective instance was displayed; and training the bias model for a specified instance using the performance data, position data, and intent data for the specified instance.

3. The computer-implemented method of claim 2, further comprising:

determining the intent data for each of the number of times the respective instance was displayed based at least in part upon a specificity of a query corresponding to the respective instance or related performance data for a session including displaying of the respective instance.

4. The computer-implemented method of claim 1, wherein the multi-intent model is trained for at least two intents including the explore intent and the action intent.

5. The computer-implemented method of claim 1, wherein the multi-intent model is one of a Poisson-Beta generative model or a Poisson-Gamma generative model.

6. The computer-implemented method of claim 1, further comprising:

receiving a search query for which the set of content is determined;

determining a current intent associated with the search query; and determining a placement of the subset of the instances of content to be presented as search results based at least in part upon the current intent.

7. The computer-implemented method of claim 6, wherein the placement of a highest ranked instance of content has a position bias value indicating a highest likelihood of an action occurring for content displayed with that placement.

8. The computer-implemented method of claim 1, further comprising:

receiving a question to be answered;

determining two or more answers corresponding to the question and comprising the set of content; and providing a best answer as the subset of the instances of content, the best answer selected based at least in part upon the corresponding normalized performance value.

9. The computer-implemented method of claim 1, further comprising:

enabling a user to specify an intent; and determining, for each instance of content of the set, a new normalized performance value based at least in part upon the intent specified by the user.

10. The computer-implemented method of claim 1, further comprising:

determining the normalized performance values for the instances of content of the set for each of two intents;

providing a first subset of the instances based at least in part upon the respective normalized performance values for a first intent of the two intents; and providing a second subset of the instances based at least in part upon the respective normalized performance values for a second intent of the two intents.

11. A system, comprising:

at least one processor; and memory including instructions that, when executed by the at least one processor, cause the system to:

determine by a content provider associated with a content manager executing in a network environment, for each instance of content of a set of content to be presented, performance data and an intent factor, the intent factor indicating a contribution to values of the performance data corresponding to a respective intent for each presentation of the instance of content, the intent factor determined using a multi-intent model trained, via a bias model executing in the network environment, using aggregated performance and position data for a plurality of instances of content, the aggregated performance based on interactions of a plurality of users with the respective instances of content to classify an intent purpose for interacting with the respective instances of content;

determine by the content provider, for each instance of content of the set, a normalized performance value based at least in part upon a respective performance value and a respective intent factor for the instance, the intent factor based at least in part on a change in performance data, associated with a change in click through rate, as a function of the position data, wherein a decreasing click through rate is indicative of an action intent, and an increasing click through rate is indicative of an explore intent; and provide, by the content provider and in response to a query, at least a subset of the instances of content of the set based at least in part upon the respective normalized performance values, the subset of instances being transmitted to a user device for display on the user device, associated with the query.

12. The system of claim 11, wherein the instructions when executed further cause the system to:

obtain the performance data and the position data or each instance of content of the set, the performance data indicating a number of actions taken for a respective instance with respect to a number of times the respective instance was displayed, the position data indicating a display position for each of the number of times the respective instance was displayed;

obtain intent data for each of the number of times the respective instance was displayed; and train the bias model for a specified instance using the performance data, position data, and intent data for the specified instance.

13. The system of claim 11, wherein the instructions when executed further cause the system to:

determine the intent data for each of the number of times the respective instance was displayed based at least in part upon a specificity of a query corresponding to the respective instance or related performance data for a session including displaying of the respective instance.

14. The system of claim 11, wherein the instructions when executed further cause the system to:

receive a search query for which the set of content is determined;

determine a current intent associated with the search query; and determine a placement of the subset of the instances of content to be presented as search results based at least in part upon the current intent.

15. The system of claim 14, wherein the placement of a highest ranked instance of content has a position bias value indicating a highest likelihood of an action occurring for content displayed with that placement.

16. A non-transitory computer-readable storage medium storing instructions that, when executed by a processor of a computing device, cause the computing device to:

determine by a content provider associated with a content manager executing in a network environment, for each instance of content of a set of content to be presented, performance data and an intent factor, the intent factor indicating a contribution to values of the performance data corresponding to a respective intent for each presentation of the instance of content, the intent factor determined using a multi-intent model trained via a bias model executing in the network environment, using aggregated performance and position data for a plurality of instances of content, the aggregated performance based on interactions of a plurality of users with the respective instances of content to classify an intent purpose for interacting with the respective instances of content;

determine by the content provider, for each instance of content of the set, a normalized performance value based at least in part upon a respective performance value and a respective intent factor for the instance, the intent factor based at least in part on a change in performance data, associated with a change in click through rate, as a function of the position data, wherein a decreasing click through rate is indicative of an action intent, and an increasing click through rate is indicative of an explore intent; and provide, by the content provider and in response to a query, at least a subset of the instances of content of the set based at least in part upon the respective normalized performance values, the subset of instances being transmitted to a user device for display on the user device, associated with the query.

17. The non-transitory computer-readable storage medium of claim 16, wherein the instructions when executed further cause the computing device to:

obtain the performance data and the position data or each instance of content of the set, the performance data indicating a number of actions taken for a respective instance with respect to a number of times the respective instance was displayed, the position data indicating a display position for each of the number of times the respective instance was displayed;

obtain intent data for each of the number of times the respective instance was displayed; and train the bias model for a specified instance using the performance data, position data, and intent data for the specified instance.

18. The non-transitory computer-readable storage medium of claim 16, wherein the instructions when executed further cause the computing device to:

receive a search query for which the set of content is determined;

determine a current intent associated with the search query; and determine a placement of the subset of the instances of content to be presented as search results based at least in part upon the current intent.

19. The non-transitory computer-readable storage medium of claim 16, wherein the instructions when executed further cause the computing device to:

receive a question to be answered;

determine two or more answers corresponding to the question and comprising the set of content; and provide a best answer as the subset of the instances of content, the best answer selected based at least in part upon the corresponding normalized performance value.

20. The non-transitory computer-readable storage medium of claim 16, wherein the instructions when executed further cause the computing device to:

determine the normalized performance values for the instances of content of the set for each of two intents;

provide a first subset of the instances based at least in part upon the respective normalized performance values for a first intent of the two intents; and provide a second subset of the instances based at least in part upon the respective normalized performance values for a second intent of the two intents.

* * * * *